United States Patent

[11] 3,628,943

| [72] | Inventor | Bengt Hjalmar Gullfeldt<br>Selangergrand 3, Stockholm-Vallingby, Sweden |
|---|---|---|
| [21] | Appl. No. | 810,796 |
| [22] | Filed | Mar. 26, 1969 |
| [45] | Patented | Dec. 21, 1971 |

[54] HERBICIDAL COMPOSITION AND METHOD OF COMBATING UNDESIRABLE PLANT GROWTH
5 Claims, No Drawings

[52] U.S. Cl. ............................................. 71/93,
71/98, 71/105, 71/108, 71/113, 71/116
[51] Int. Cl. ............................................. A01n 9/22,
A01n 9/12
[50] Field of Search .......................... 71/105, 92, 111, 115

[56] References Cited
UNITED STATES PATENTS

| 3,318,681 | 5/1967 | Yates ........................... | 71/98 |
|---|---|---|---|
| 3,374,084 | 3/1968 | Wijma et al. .................. | 71/98 X |

FOREIGN PATENTS

| 1,442,294 | 5/1966 | France .......................... | 71/92 |
|---|---|---|---|
| 1,067,032 | 4/1967 | Great Britain ................. | 71/105 |

*Primary Examiner*—James O. Thomas, Jr.
*Attorney*—Frank R. Trifari

ABSTRACT: Total herbicidal composition comprising a mixture of a dehalogenated benzonitrile or a derivative thereof, a halogenated aliphatic carboxylic acid and a triazine or a halogenated phenoxy-alkyl-carboxylic acid.

HERBICIDAL COMPOSITION AND METHOD OF COMBATING UNDESIRABLE PLANT GROWTH

The present invention relates to a herbicidal composition and to the use thereof for controlling undesirable growth of plants.

For combating undesirable growth of plants, particularly, the annual and permanent weeds, various groups of herbicides are available. There may be mentioned halogenated phenoxyalkyl carboxylic acids, the salts or esters thereof, triazines, halogenated alkyl-carboxylic acids or dichlorobenzil or compounds converted into it when used in the soil. Of these groups of compounds especially the following compounds have become known:

2,4-dichlorophenoxy-acetic acid or salts or esters thereof,
2,4,5-trichlorophenoxy-acetic acid or
2,4,5-trichlorophenoxy-propionic acid or salts or esters of these acids,
2-chloro-4-ethylamino-6-isopropylamino-s-triazine,
2-chloro-4,6-bisethylamino-2-triazine,
2,2-dichloro-propionic acid,
1,1,1-trichloro-acetic acid or the salts of the latter compounds,
2,6-dichloro-benzonitrile,
2,6-dichlorothiobenzamide,
N-hydroxymethyl-2,6-dichlorothiobenzamide.

The herbicidal activity of these compounds is different, which restricts on the one hand the practical usability of the separate compounds, but offers on the other hand the possibility of finding special uses or improving others by making combinations of different active compounds.

It has been proposed to combine 2,6-dichlorobenzonitrile with given halogenated phenoxy-alkyl-carboxylic acids or salts thereof. It is also known to make combinations of 2,6-dichlorobenzonitrile generators, that is to say compounds converted in the soil into 2,6-dichlorobenzonitrile and given halogenated phenoxy-alkyl-carboxylic acids. Generators of 2,6-dichlorobenzonitrile are, for example, N-hydroxymethyl-2,6-dichlorothiobenzamide and 2,6-dichlorothiobenzamide.

As combinations there may be mentioned mixtures of 2,6-dichlorothiobenzamide or 2,6-dichlorobenzonitrile and an alkyl- or alkoxy-alkyl-ester of 2-methyl-4-chloro-phenoxy-acetic acid or of γ-2-methyl-4-chlorophenoxy-butyric acid (British Pat. specification No. 997,646). Furthermore there is known from Belgian Pat. specification No. 689,525 a mixture of 2,6-dichlorobenzonitrile (or a generator thereof) and the sodium salt of 2-(2,4-dichloro-phenoxy)-propionic acid, while in Japanese Pat. application No. 5559/67 a herbicidal composition on the basis of 2-(2-methyl-4-chlorophenoxy)-propionic acid or a salt thereof and 2,6-dichlorobenzonitrile or a generator thereof is disclosed.

There is furthermore known 2,6-dichloro-4-hydroxy-benzonitrile combined with 2,2'-dichloropropionic acid or a salt thereof (British Pat. specification No. 1,067,032), while there is further proposed to combine a salt of 2,2'-dichloropropionic acid with 2-chloro-4-ethylamino-6-isopropyl-amino-s-triazine (atrazine) or with 2-chloro-4,6-ethylamino-s-triazine ("Chem. Abstr." 54, 25,493 g. (1960)). There is furthermore known a herbicidal composition on the basis of 2-methyl-thio-4,6-bisisopropyl-amino-2-triazine (prometrine), 2-(2'-methyl-4'-chlorophenoxy)-propionic acid of salts or esters thereof and 2,6-dichlorobenzonitrile or 2,6-dichlorothiobenzamide (Japanese Pat. specification No. 25,438/67).

Finally reference may be made to Pat. specification No. 39,194 issued by the German Democratic Republic, in which a composition for weedkilling in potato cultures is disclosed to be used prior to the growth of the plants, said composition consisting of a mixture of 2-chloro-4,6-ethylamino-s-triazine, 4,6-dinitro-o-cresol, as the case may be, 4-chloro-2-methylphenoxy-acetic acid, as the case may be, α,α'-dichloro-propionic acid and, as the case may be, trichloro-acetic acid.

These known compositions are said to be suitable for combating given weeds in certain cultures or to be suitable for use as so-called "total weedkillers," that is to say, means capable of killing as far as possible all growth of plants on fallow land, along roads and railroads.

The invention relates to a composition for combating annual and permanent plants, which may be considered to be a "total weedkiller." The compositions according to the invention are particularly suitable for combating deep-rooted weeds.

The particularlity of the composition according to the invention is that comparatively small quantities of the active substances are sufficient to achieve practically complete killing of given weeds, which cannot or can be hardly combated by each of the separate components. Of these weeds there may be mentioned: Ranunculus acris, tussilago farfara, Sonchus oleraceus, Urtica urens and Echium vulgare. Furthermore the composition according to the invention is particularly suitable for combating couch-grass (Agropyron repens, Triticum repens).

The invention relates to a herbicidal mixture containing as active ingredients a mixture of a. one or more components of the general formula:

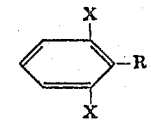

wherein
X is a halogen atom, for example, Cl or Br and
R is a —C N—, —C( S)—NH$_2$— or —C( S)—NH—CH$_2$OH— group;

b. one or more halogenated aliphatic carboxylic acids or salts thereof having at the most four carbon atoms;

c. one or more triazines of the general formula

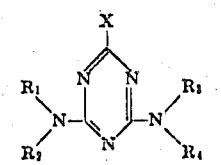

wherein
X is a chlorine or bromine atom or lower alkyl- or alkenyl-group bonded with the triazine ring by sulfur or oxygen,
R$_1$ is a lower alkyl-, alkenyl- or alkoxy-alkyl-group,
R$_2$ and R$_3$ are hydrogen or a lower alkyl- or alkenyl-group and
R$_4$ is a lower alkoxy-alkyl-group and/or d. a halogenated phenoxy-alkyl-caroboxylic acid or a salt or an ester thereof.

Among the various compositions which are suitable in accordance with the invention, especially the following combinations provided very satisfactory results:

A. 2,6-dichlorobenzonitrile, 2,2-dichloropropionic acid in the form of the sodium salt, 2-chloro-4-ethylamino-6-isopropylamino-s-triazine;

B. N-hydroxymethyl-2,6-dichlorothiobenzamide, 2,2-dichloro-propionic acid in the form of the sodium salt, 2,4,5-trichlorophenoxy-propionic acid in the form of the sodium salt;

C. 2,6-dichlorobenzonitrile, trichloro-acetic acid, 2-chloro-4,6-bisethylamino-s-trizaine;

D. 2,6-dichlorothiobenzamide, 2,2-dichloro-propionic acid, 2-chloro-4-ethylamino-6-isopropylamino-s-triazine, 2,4,5-trichlorophenoxy-propionic acid in the form of the sodium salt.

The mixture of active ingredients may be processed in various ways to obtain compositions ready for use, such as dusts, miscible oils, but the active substances are preferably processed into granules. This may be achieved in a comparatively simple manner by mixing the active ingredients with wetting agents, absorption agents and carrier materials such as polyglycol, silicon dioxide and ground marmor. A further possibility consists in that granules of the individual active ingredients are produced and mixed with each other. This permits using separate techniques for producing granules of the various substances particularly suitable in respect of the special properties of the active substances. For combating the weeds the granules are preferably employed in doses of 100 to 1,000 kgs./hectar, while the active ingredients are contained in the granules by 0.5 to 5 percent.

Particularly satisfying results have been obtained by 100 to 400 kgs. of granules/hectar, which contained 1 to 2 percent of 2,6-dichlorobenzonitrile or N-hydroxymethyl-2,6-dichlorothiobenzamide or 2,6-dichlorothiobenzamide, furthermore 2 to 5 percent of 2,2-dichloro-propionic acid (if desired in the form of the sodium or potassium salt) or trichloro-acetic acid (if desired in the form of the sodium or potassium salt) and 1 to 2 percent of 2-chloro-4-ethylamino-6-isopropylamino-s-triazine or 2-chloro-4,6-bisethylamino-s-triazine or 2,4,5-trichlorophenoxy-propionic acid (if desired in the form of the potassium or sodium salt).

The invention will be described with reference to the following examples.

Compositions were made as follows:

1.
|  | % of weight |
|---|---|
| a. 2,6-dichloro-benzonitrile | 1.0 |
| b. 2,2-dichloro-pripionic acid (sodium salt) | 2.5 |
| c. 2-chloro-4-ethylamino-6-isopropylamino-s-triazine | 1.0 |
| Polyglycol® | 3.0 |
| Microsel E® (silicon dioxide) | 2.0 |
| Marmor dust | 90.5 |
|  | 100.0 |

2.
|  | % by weight |
|---|---|
| a. N-hydroxy-methyl-2,6-dichlorothiobenzamide | 1.0 |
| b. 2,2-dichloro-pripionic acid (sodium salt) | 1.0 |
| c. 2,4,5-trichlorophenoxy-propionic acid (potassium salt) | 2.5 |
| Polyglycol® | 3.0 |
| Microsel E® (silicon dioxide) | 2.0 |
| Marmor dust | 90.5 |
|  | 100.0 |

3.
|  | % by weight |
|---|---|
| a. 2,6-dichlorobenzonitrile | 1.0 |
| b. 2,2-dichloro-pripionic acid (sodium salt) | 1.2 |
| c. 2,4,5-trichlorophenoxy-propionic acid (potassium salt) | 1.0 |
| Polyglycol® | 3.0 |
| Microsel E® (silicon dioxide) | 2.0 |
| Marmor dust | 91.8 |
|  | 100.0 |

The compositions mentioned under (1), (2) and (3) were produced by mixing the constituents in a mixer until a homogenous mixture was obtained.

Table I indicates the average result of five different tests with a composition (1) and with a composition A containing 1 percent of 2-chloro-4-ethylamino-6-isopropylamino-2-triazine and 1 percent of 2,6-dichloro-benzonitrile and otherwise like composition (1).

The two compositions were used in quantities of 400 kgs./hectar. The measurements were carried out 2 months after the application of the compositions to the plants.

TABLE I

| Composition | Weight of plants in, g./m.² | Weight of grasses in, g./m.² | Total weight of plants, g./m.² | Herbicidal effect— | | |
|---|---|---|---|---|---|---|
|  |  |  |  | Plants | Grasses | Total |
| Untreated | 390 | 437 | 827 | 100 | 100 | 100 |
| A | 117 | 125 | 242 | 30 | 29 | 29 |
| 1 | 71 | 19 | 90 | 18 | 4 | 11 |

From this table it is particularly apparent to what extent the effect of the composition according to the invention is superior on grasses to the effect of the composition A containing two of the three active ingredients of compositions (1).

In a further test composition A was compared with composition (2) and with a fifth composition (B) containing 1 percent of 2-chloro-4-ethylamino-6-isopropylamino-2-triazine and 1 percent of N-hydroxymethyl-2,6-dichlorothiobenzamide as active ingredients.

The treatment of plants and grasses was repeated three times with these compositions. The doses were 400 kgs./hectar and the results were determined 2 months after the start of the treatment.

TABLE II

| Composition | Weight of plants in, g./m.² | Weight of grasses in, g./m.² | Total weight of plants, g./m.² | Herbicidal effect— | | |
|---|---|---|---|---|---|---|
|  |  |  |  | Plants | Grasses | Total |
| Untreated | 432 | 463 | 895 | 100 | 100 | 100 |
| A | 140 | 161 | 301 | 31 | 35 | 34 |
| 1 | 39 | 24 | 113 | 21 | 5 | 13 |
| B | 123 | 184 | 307 | 28 | 40 | 34 |
| 2 | 118 | 38 | 156 | 27 | 8 | 17 |

Also this table shows the superior herbicidal effect of the compositions in accordance with the invention as compared with the effect of those containing only two of the active ingredients.

In a third test the composition 1 was compared with composition A and with a sixth composition (C) containing as an active ingredient only 2,6-dichlorothiobenzamide in a quantity of 7.5 percent. The latter composition also as a granule was used in a dosis of 200 kg./hectar and the other compositions were used in quantities of 400 kgs./hectar. The tests were carried in duplicate and the results were determined 2 months later.

TABLE III

| Composition | Weight of plants in, g./m.² | Weight of grasses in, g./m.² | Total weight of plants, g./m.² | Herbicidal effect— | | |
|---|---|---|---|---|---|---|
|  |  |  |  | Plants | Grasses | Total |
| Untreated | 326 | 398 | 724 | 100 | 100 | 100 |
| A | 8,181 | 71 | 152 | 25 | 18 | 21 |
| C | 5,555 | 97 | 152 | 17 | 24 | 21 |
| 1 | 43 | 8 | 51 | 13 | 2 | 7 |

Also these data show that the composition according to the invention has considerably better herbicidal properties than a composition containing one or two of the active ingredients. Especially the composition 1 has a very good effect on grasses.

In a further test the activity of composition 1 on a number of specific weeds was examined. The activity of 2,6-dichlorobenzonitrile, of 2,2-dichloro-propionic acid in the form of the sodium salt and of 2-chloro-4-ethylamino-6-isopropylamino-s-triazine on these plants was determined for compositions containing these substances as sole herbicides, as well as that of the combination of 2,6-dichlorobenzonitrile with 2-chloro-4-ethylamino-6-isopropylamino-2-triazine.

The results are indicated in the following table.

TABLE IV.

| Name of the weed | % of killing by the compositions | | | | |
|---|---|---|---|---|---|
|  | 1 | 2 | 3 | 4 | 5 |
| *Ranunculus acris* | 40 | 0 | 0 | 0 | 100 |
| *Taraxacum vulgare* | 80 | 0 | 50 | 0 | 100 |
| *Matricaria inodora* | 90 | 80 | 50 | 0 | 100 |
| *Matricaria chamomilla* | 60 | 50 | 0 | 0 | 100 |
| *Tussilago farfara* | 50 | 10–20 | 0 | 0 | 100 |
| *Sonchus oleraceus* | 20 | 0 | 0 | 0 | 100 |
| *Urtica urens* | 60 | 10 | 0 | 0 | 100 |
| *Agropyron repens* | 60 | 40 | 40 | 90 | 100 |
| *Egium vulgare* | 10 | 0 | 0 | 0 | 100 |

The compositions 1 to 5 were made as follows:

1. Granule: content 1.5 percent of 2,6-dichlorobenzonitrile and 1.5 percent of 2-chloro-4-ethylamino-6-isopropylamino-s-triazine, quantities of 400 kgs./hectar;
2. Granule: content 7.5 percent of 2,6-dichlorobenzonitrile, quantities of 300 kgs./hectar;
3. Granule: content 4 percent of 2-chloro-4-ethylamino-6-isopropylamino-s-triazine, quantities of 250 kgs./hectar;
4. Aqueous solution of the sodium salt of 2,2-dichloropropionic acid containing 15 kgs. of a substance of a purity of 85 percent;
5. Granule: content 1 percent of 2,6-dichloro-benzonitrile, 1 percent of 2-chloro-4-ethylamino-6-isopropylamino-s-triazine, 2.5 percent of 2,2-dichloro-propionic acid in the form of the sodium salt, quantities of 100 kgs./hectar.

From the table there appears a nonpredictable synergistic activity of the constituents of the composition according to the invention.

What is claimed is:

1. A herbicidal composition comprising about 1 to 2 percent by weight of a member selected from the group consisting of 2,6-dichlorobenzonitrile, N-hydroxy-methyl-2,6-dichlorothiobenzamide and 2,6-dichlorothiobenzamide, about 2 to 5 percent by weight of a member selected from the group consisting of 2,2-dichloropropionic acid or a salt thereof and trichloroacetic acid or a salt thereof and about 1 to 2 percent by weight of at least one member selected from the group consisting of 2-chloro-4-ethyl amino-6-isopropylamino-s-triazine, 2-chloro-4,6-bisethylamino-5-triazine, and a trichlorophenoxy-alkane-carboxylic acid or a salt thereof and finely divided carriers therefore.

2. The herbicidal composition of claim 1, wherein there is present about 1 to 2 percent by weight of a member selected from the group consisting of 2,6-dichlorobenzonitrile, N-hydroxy-methyl-2,6-dichlorothiobenzamide and 2,6-dichlorothiobenzamide, about 2 to 5 percent by weight of a member consisting of 2,2-dichloropropionic acid, the sodium salt thereof and the potassium salt thereof and about 1 to 2 percent by weight of a member selected from the group consisting of 2-chloro-4-ethyl-amino-6-isopropylamino-s-triazine, 2-chloro-4,6-bisethylamino-5-triazine, 2,4,5-trichlorophenoxy-propionic acid, the potassium salt of said propionic acid and the sodium salt of said propionic acid.

3. The herbicidal composition of claim 1 wherein there is present 2,4,5-trichlorophenoxy-propionic acid, the potassium salt thereof or the sodium salt thereof.

4. The herbicidal composition of claim 1 wherein there is present a triazine selected from the group consisting of 2-chloro-4-ethyl-amino-6-isopropylamino-s-triazine and 2-chloro-4,6-bisethylamino-5-triazine.

5. The herbicidal composition of claim 1 wherein there is present a member selected from the group consisting of 2,2-dichloropropionic acid, the sodium salt thereof, the potassium salt thereof, trichloroacetic acid, the potassium salt thereof and the sodium salt thereof.

* * * * *

UNITED STATES PATENT OFFICE
CERTIFICATE OF CORRECTION

Patent No. 3,628,943      Dated December 21, 1971

Inventor(s) Bengt Hjalmar Gullfeldt

It is certified that error appears in the above-identified patent and that said Letters Patent are hereby corrected as shown below:

On the cover sheet insert -- [73] Assignee U. S. Philips Corporation, New York, N. Y. --.

Signed and sealed this 1st day of August 1972.

(SEAL)
Attest:

EDWARD M. FLETCHER, JR.
Attesting Officer

ROBERT GOTTSCHALK
Commissioner of Patents